June 8, 1937. J. A. GERMONPREZ Re. 20,397

REGISTER AND GRILLE

Original Filed Sept. 30, 1931 2 Sheets-Sheet 1

INVENTOR
John A. Germonprez

BY Whittemore, Hulbert & Whittemore, Belknap

ATTORNEYS

June 8, 1937. J. A. GERMONPREZ Re. 20,397
REGISTER AND GRILLE
Original Filed Sept. 30, 1931 2 Sheets-Sheet 2
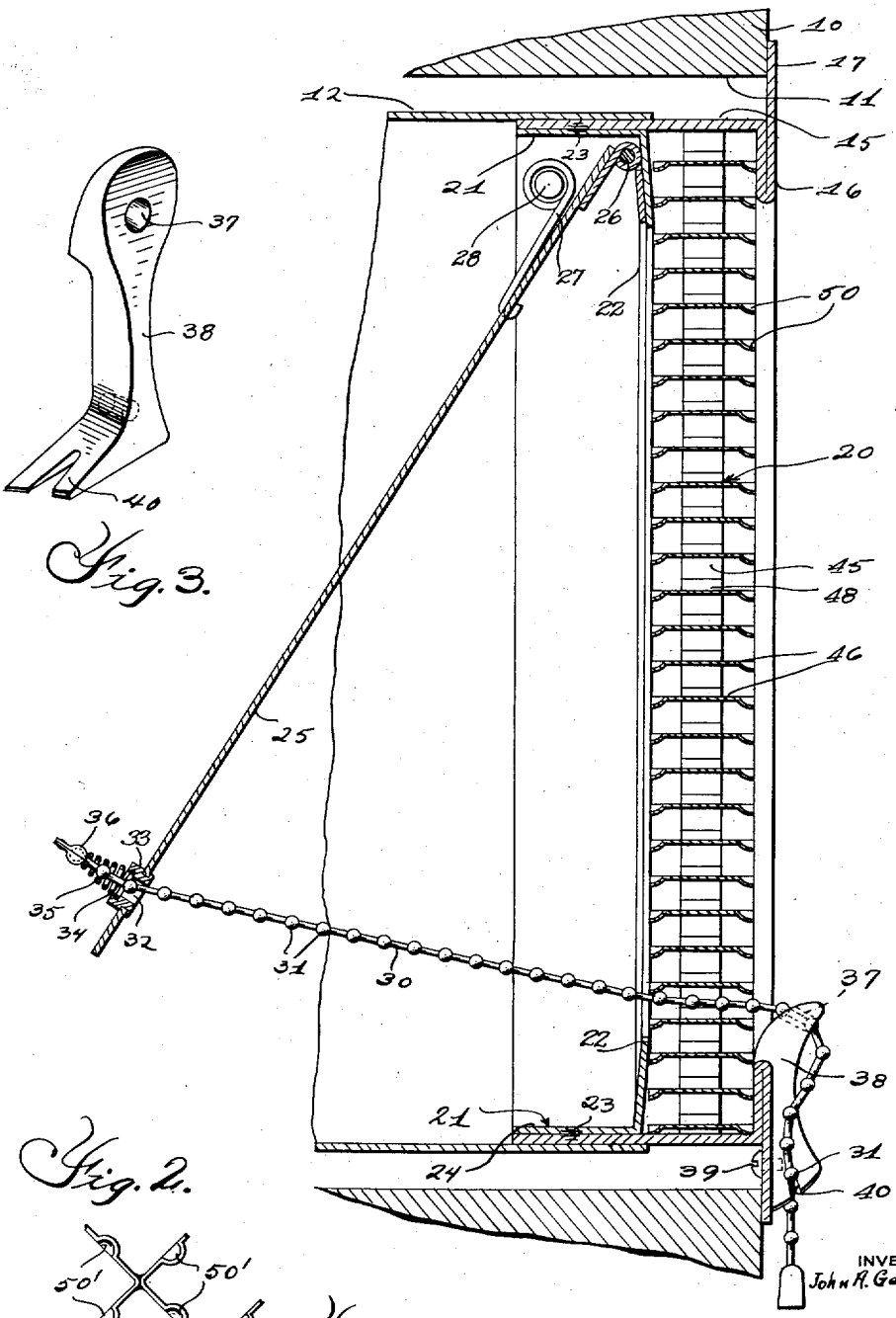
Fig. 3.
Fig. 2.
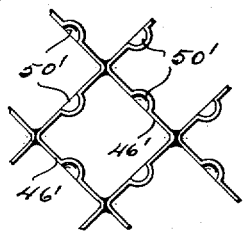
Fig. 7.
INVENTOR
John A. Germonprez
BY Whittemore, Hulbert & Whittemore & Belknap
ATTORNEYS Reissued June 8, 1937

Re. 20,397

UNITED STATES PATENT OFFICE 20,397

REGISTER AND GRILLE

John A. Germonprez, Grosse Pointe Park, Mich., assignor to Uni-Flo Corporation, a corporation of Michigan Original No. 1,945,972, dated February 6, 1934, Serial No. 566,149, September 30, 1931. Application for reissue April 1, 1935, Serial No. 14,139

12 Claims. (Cl. 98—106)

This invention relates to a register and grille construction adapted more particularly for mounting in an opening in the wall or floor of a room, through which opening heated or ventilating air is forced into the room.

One of the primary objects of this invention is to provide a grille construction which will be substantially invisible and which will not therefore forcibly attract the eye of a person entering the room in which the register is mounted.

A further object of this invention is to provide a register and grille construction by which vision into the stack head or concealed heat cabinet with which the grille is associated will be minimized.

The invention further contemplates the provision of a register and grille construction which will offer little resistance to the air at low as well as at high velocities.

An important object of the invention is to provide a grille which, in addition to its function of providing an artistic covering for the open end of an air duct, operates to control air flow beyond the grille causing rapid mixing of the incoming air with the room air thereby reducing the velocity of the former and accelerating circulation of the latter into the incoming air current so that the resultant moving air will be thoroughly distributed throughout the room and have a velocity and temperature which is comfortable to the occupants of the room and this in spite of pronounced differences in temperature between the incoming air and the room air.

The invention further contemplates the provision of a structure of the above mentioned character in which all air noises will be minimized, in which a uniform flow of the air will be effected, and by which foreign objects will be entirely prevented from entering the stack or heat cabinet with which the grille is associated.

A further object is to provide a register for an air duct having a damper arranged for actuation in a novel manner.

Numerous other objects and advantages of this invention will become more apparent as the following description proceeds, particularly when reference is had to the accompanying drawings, wherein:

Fig. 2 is a sectional view taken substantially on the line 2—2 of Fig. 1;

Fig. 3 is a detail perspective view of one of the elements forming a part of the structure shown in Fig. 1;

Fig. 7 is a view similar to Fig. 4 showing a slightly modified form of construction.

Figure 1:
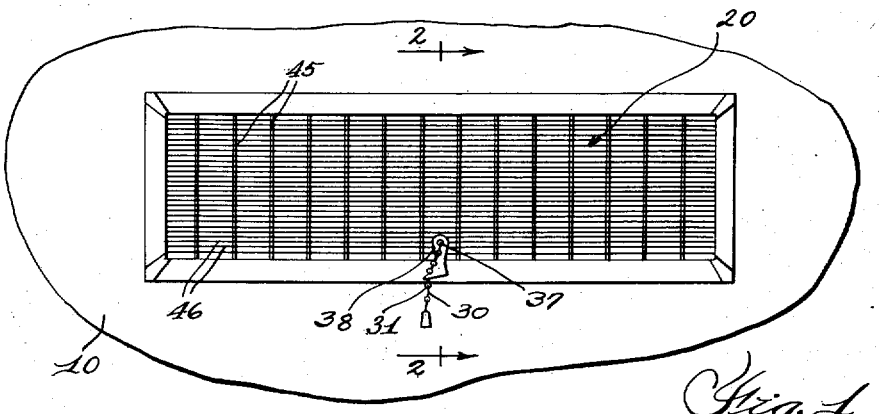
Fig. 1 is an elevational view of a register and grille constructed in accordance with the teachings of this invention.

It is, at the present time, quite generally the practice to provide forced air conditioning or ventilating systems or concealed radiation in buildings. For these systems, register openings are formed in the walls or floors of the rooms and grilles are utilized for partially closing these openings.

Heretofore grilles for this purpose have been constructed on the theory that the main requirement was a maximum of free air opening. As a result, these grilles have been built with face design sections or bars of substantial width and arranged to provide relatively large openings through which the air might pass. The most popular type of grille has been the square mesh grille with three-quarter inch square holes formed by spaced bars, these bars being usually one-quarter of an inch in width.

Grilles of this character, even though formed to provide pleasing designs, have possessed numerous disadvantages, and it is an object of the present invention to eliminate these disadvantages in a manner which will hereinafter be more fully described.

Referring then particularly to the drawings wherein like reference characters designate corresponding parts throughout all views, the numeral 10 designates the wall or floor of a room, this wall being provided with a suitably located opening 11. The reference character 12 designates a stack or housing located within the opening 11, it being understood that this stack may be in communication with a forced air conditioning and ventilating system or a remotely located heating system. Further, the stack 12 might constitute the outlet of a suitable housing in which a radiator is positioned, as is customary practice in modern concealed radiation heating systems.

According to the teachings of this invention, there is provided a casing 15 arranged to fit snugly within the stack or housing 12 and secured thereto in any desired manner. This casing is bent or otherwise formed adjacent its outer end to provide an inwardly extending flange 16 and an outwardly extending flange 17, the latter flange engaging the outer surface of the wall adjacent the opening therein.

Positioned within the casing 15 is a grille designated generally by the reference character 20. This grille engages the inner surface of the flange 16 and is held in firm engagement with this flange by means of a second casing 21 having a flange 22 which engages the rear face of the grille 20. The casing 21 fits snugly within the casing 15 and is spot-welded thereto at spaced points, as designated by the reference character 23. The flange 22 of this inner casing preferably extends at an obtuse angle to the flange 24 of the casing so that when the inner casing is forced within the outer casing the flange 22 thereof resiliently engages the grille 20 to firmly force the same into engagement with the flange 16.

The inner casing 21 constitutes a support for a damper 25, this damper being hingedly mounted in the upper end of the inner casing, as designated by the reference character 26. A coil spring 27 coiled about a pin 28 fixed to the inner casing adjacent the upper end thereof is fixed at its end to the damper and tends to move the same to open position.

For moving the damper to closed position, there is provided a flexible pull member or chain 30 provided throughout its length with spaced balls or protuberances 31. This chain extends at its one end through an opening 32 formed in the damper. Fitted in this opening is a sleeve 33, and this sleeve is provided with an enlarged recess 34 to provide a seat for a spring 35. This spring is of conical shape, and the chain passes through this spring and is provided at its end with an enlargement 36 adapted to engage the free end of the spring.

The other end of the chain passes through the grille 20 and through an opening 37 formed in a locking member 38 which is bolted or otherwise secured as at 39 to the flange 17 of the outer casing. This locking member is provided with a slot 40 with which the chain may be engaged, the arrangement being such that when the chain is engaged in the slot the enlargements or balls on the chain prevent longitudinal movement of the chain through the slot and thus hold the damper in adjusted position. The spring 35 provides means for facilitating locking engagement of the chain in the slot when the damper is moved to closed position since this spring will give sufficiently to permit movement of the chain to a position where two of the enlargements therein will be arranged on opposite sides of the slot in the locking member.

It will be noted that the grille is maintained within the outer casing by engagement of the flange of the inner casing with the inner face of the grille adjacent the edge thereof. Thus grilles of different thicknesses may be mounted in the outer casing, the inner casing being properly positioned within the outer casing to effectively hold the grille in position.

It will be noted further that the portion of the grille frame or outer casing which fits into the stack head is entirely smooth so that a perfect seal is effected at this point, thus eliminating the escape of the air around the grille frame. Still further, the flange 24 of the inner casing provides a shelf or flat surface which snugly engages the free edges of the damper when the latter is moved to closed position. This is an important feature of the construction since it eliminates air noises such, for example, as air whistle which frequently develops because of the presence of a small opening between the edge of the damper and the damper frame when the damper is in closed position.

As brought out before, the present invention contemplates so constructing the grille 20 as to eliminate the numerous objections and disadvantages of the grilles heretofore used. The structure of the grille will first be described, and then several of the advantages of this type of grille will be explained in detail in order that a more complete understanding of the inventive principles embodied in this application may be obtained.

Figure 4:
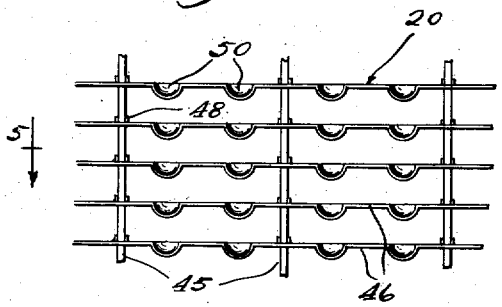
Fig. 4 is an enlarged elevational view of a portion of the grille shown in Fig. 1.
Figure 6:
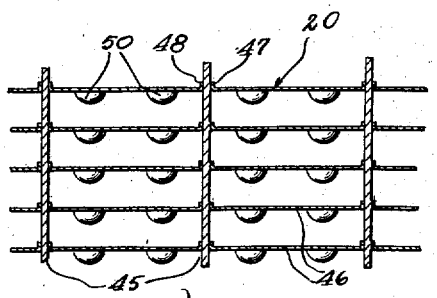
Fig. 6 is a sectional view taken substantially on the line 6—6 of Fig. 5.
Figure 5:
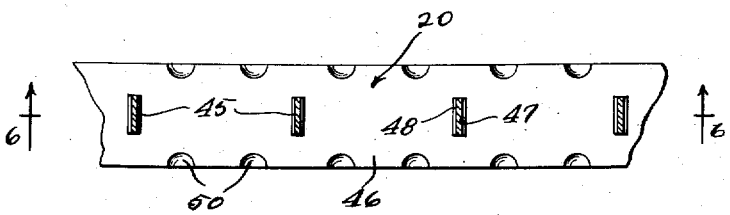
Fig. 5 is a sectional view taken substantially on the line 5—5 of Fig. 4.

Referring then particularly to Figs. 2 and 4 to 6, inclusive of the drawings, it will be noted that the grille comprises a plurality of spaced thin strips or fins 46 which are supported and held in position by thin flat bars 45, the latter being forced through slots 47 formed in the fins. Flanges 48 are preferably formed surrounding the slots, and these flanges embrace the adjacent portions of the bars, as clearly illustrated in Fig. 6 of the drawings. After the bars and fins have been properly assembled, the whole unit may be made rigid by sweating the unit in solder.

Both the fins and the bars are so positioned that their narrow edges face the front of the grille, and the fins are provided preferably along both their front and rear edges with depressions 50 formed by bending spaced portions of the edges out of the planes of the fin bodies leaving inclined and rounded surfaces extending partially across the narrow passages defined by the adjacent fins. By providing such depressions along both the entering and discharge edges of the fins, the latter are deformed uniformly and objectionable distortion thereof avoided. The projections along the discharge edges constitute agitators which break up the air streams confined by the fins with the result that the air discharged from the grille is mixed with or distributed throughout the room in an advantageous manner later to be described.

In Fig. 7 a slightly modified form of grille construction is disclosed as comprising thin strips or fins 46', these strips being provided in their edges with the depressions 50'. These strips are bent into a zig-zag formation, as illustrated, and then the abutting portions of these strips, when a number of strips are assembled together, are sweated together to form a unitary construction of the cellular or honeycomb type. Thus the grille may be formed without the use of the supporting bars and thus be formed entirely of thin strips or fins.

Among the numerous advantages of the construction described above, several will be described in detail. As brought out before, a grille construction, when mounted in a room, should be as nearly invisible as it is possible to make the same. With the old type grille in which the cross bars were three-thirty-seconds of an inch or greater in width, the grille was readily visible from any point in the room and in fact, forcibly attracted the attention of persons entering the room. This condition is evidenced by the fact that designers frequently attempted to improve the appearance of these grilles by curving the cross bars or otherwise shaping the same into suitable designs.

With a grille constructed, however, in accordance with the teachings of this invention, the eye passes the grille without any noticeable reaction and without being forcibly attracted to the same. With the fins approximately twenty-thousandths of an inch thick and with these fins spaced apart approximately one-quarter of an inch and with the supporting bars of one-sixteenth of an inch thickness and of one-quarter inch width, it has been found that the grille becomes practically invisible at a distance of approximately ten feet. At less distances the only visible parts of the grille are the narrow vertical supporting bars 45. Also it will be seen that by making the fins from narrow metallic strips of ribbon-like thinness, very little resistance is offered thereby to the flow of air. At the same time, they are sufficiently wide to straighten out the flow of air through the grille.

A further important advantage of this construction is the fact that the grille practically eliminates vision into the stack head. With the old type construction in which the bars define relatively large openings, it was possible to readily see through the grille into the stack or concealed heat chamber back of the grille. With the relatively thin strips spaced and supported in the manner described in this application, the openings through the grille are in the form of narrow slots which are extremely difficult to look through, and because of the depth of the grille formed by the width of the fins, it is impossible to see anything behind the grille when the vision is directed toward the grille at a very slight angle.

A further and exceedingly important advantage of the subject construction consists in the reduction of air resistance effected by forming the grille in the manner described. Any resistance to the flow of air tends not only to throw the whole air heating or conditioning system out of balance, but tends also to decrease the efficiency of the entire installation. If the system utilizes air blowers or the like to effect a circulation of the air, increased pressure must be provided to overcome the resistance to which the air flow is subjected. If the grille is utilized with a heating system of the concealed radiation type or gravity warm air installation, increased head pressure has to be produced. It is therefore apparent that a grille which reduces the air resistance to a minimum is particularly desirable. This is accomplished in the present instance through the use of the thin sheet metal fins and cross bars and by constructing the deflecting elements 50 so that they project only part way to the adjacent fins and are spaced along the latter with the corresponding elements on the different fins arranged in alinement with each other.

A grille constructed in accordance with the teachings of this invention, when compared with a standard perforated metal square mesh grille with thirteen-sixteenths inch square holes and three-sixteenths inch spacing bars, shows the following comparison as to air resistance. The above mentioned type of standard grille was chosen because of its past popularity, while a grille having openings and bars of the size mentioned was selected as compared to a grille having three-quarter inch square holes and one-quarter inch space bars which are usually used to give a greater free air opening. Compared to daylight area which is the maximum condition obtainable or the condition which would exist if the air were permitted to flow through the wall opening without any grille whatever, it was found that a grille constructed in accordance with the teachings of this invention was approximately 89.8 percent effective as compared to an effectiveness of 77 percent of the standard square mesh grille. Compared to the aperture of the frame, the added resistance to the air flow imposed by the fin and bar type grille at 400 ft. velocity was only .0041 inch water gauge, or 25 percent above that of the aperture alone, while with a grille of the standard square mesh type, there was an additional air resistance of 71 percent over the aperture of the frame. Since the horse power required to force the air through the grille is directly proportional to the resistance, it is obvious that a considerable saving in horse power is effected, it having been found that it requires 36 percent more horse power to force air through an old type grille than to force air through a grille constructed in accordance with the teachings of this invention.

As brought out before, a further advantage of this construction consists in the elimination of air noises, such as air whistle, and the elimination of all projections on the grille frame so that an effective seal is obtained between the stack and this frame.

The invention possesses a further important advantage in that with the agitators or deflectors 50 constructed and arranged as above described, the air leaving the discharge side of the grille is diffused and distributed throughout the room air in a novel manner such that the room occupants are not subjected to widely varying temperatures or objectionable drafts even though the air may be discharged into the room at a comparatively high velocity and there may be a pronounced difference between the temperature of the incoming air and the room air. This desirable action may be attributed in part to a turbulence or swirling of the air streams produced beyond the discharge face of the grille by impingement of the confined air streams against the inclined deflecting surfaces of the bent portions 50 as these streams are discharged from the grille. Also, since the elements 50 are uniformly inclined in one direction transversely of the front face of the grille, and are spaced a short distance apart longitudinally of the fins, they exert a deflecting effect upon the whole body of air discharged from the grille and thus affect the angle at which the air leaves the grille. As herein shown, those deflectors protrude approximately one-third of the distance across the passages formed between the fins and the longitudinal spacing of the deflectors is only slightly greater than the distance between the fins.

An important advantage in the use of the elements 50 as deflectors is that they render unnecessary the mounting of the fins at different angles to obtain various degrees of deflection, but on the contrary permit the fins to be assembled uniformly for all grilles. This is desirable from a manufacturing standpoint in that it simplifies and reduces the cost of construction. In addition to the performance of the diffusing function above referred to, due to the spacing of the elements 50 longitudinally of the fins, such spacing serves to perform an important function affecting the appearance of the grille. Thus it will be seen that these elements have the function of breaking up the straight line effect which would otherwise be formed by the front edges of the fins. Therefore any accidental departure of the forward edges of the fins from true parallel relation is rendered unnoticeable.

To enable the diffusing elements 50 to perform the above functions, the fins 20 are spaced sufficiently close together and the spacing thereof is so correlated with the widths of the fins measured in the direction of the air flow from the grille that the narrow air streams into which the body of air moving through the duct is divided by the fins are so closely confined that the major portion of each air stream is subjected to the action of the elements. Thus, the fins 20 are preferably spaced apart not more than a distance of approximately one-quarter of an inch and the width of the fins is more than twice the width of the fin slots being about three-quarters of an inch in the present instance. By employing deflecting surfaces which project in one direction from the fins, extend approximately one-third of the way to the surface of the adjacent fin and are alined with the deflecting surfaces of the adjacent fins, the free air area of the grille is not reduced to an objectionable degree.

From the foregoing, it will be observed that through the provision of the diffusing elements 50 which do not add to the manufacturing cost, the grille is utilized not only to provide a neat and substantially unnoticeable covering for a duct opening but also performs the additional function of controlling the air flow beyond the face of the grille to effect proper distribution of the incoming air throughout the room and this without increasing appreciably the resistance offered by the grille to the flow of air therethrough.

It will be noted that the flexible actuating member which hangs downwardly adjacent the wall in any position of adjustment of the damper eliminates the necessity of providing a rigid actuating member which might project into the room and which might, because of its projection, become damaged or tear the clothing of persons coming into contact with the same. The resilient means associated with the end of the flexible control member which is secured to the damper provides for a complete closing of the damper, thus facilitating the elimination of an opening between the edge of the damper and the flange 24.

It has been found further that the close spacing of the fins of the grille, together with their depth, provides for a uniform flow of air through the grille opening without the necessity of utilizing air deflector blades such as have heretofore been utilized with the grilles of standard construction. Still further, the close spacing of the fins makes the openings through the grille so small that all foreign objects are prevented from passing through the grille and into the stack or heat chamber in back of the same.

From the above it will be apparent that the invention provides an improved register and grille construction which efficiently accomplishes the results desired and eliminates the numerous objections and disadvantages of the grilles heretofore used. While the invention has been described in detail, it is to be clearly understood that the description is for the purposes of illustration only and is not definitive of the limits of the inventive idea. The right is reserved to make such changes in the details of construction and arrangement of parts as will fall within the purview of the attached claims.

What I claim as my invention is:

1. In a device of the character described, a casing adapted to be positioned in an opening in a wall, said casing being provided with an inwardly extending flange adjacent its outer end, a grille in said casing engaging the rear face of said flange, and a second casing within said first mentioned casing having an inwardly directed flange resiliently engaging the rear face of said grille to urge the same into engagement with the flange of the first mentioned casing.

2. In a device of the character described, an outer casing adapted to be positioned in an opening in a wall, said casing being provided with an outwardly extending flange adapted to engage the outer surface of the wall adjacent the opening therein and being provided with an inwardly extending flange adjacent its outer end, a grille within said casing for substantially closing the front thereof, said grille engaging the inner face of the inwardly directed flange on said casing, and a second casing fixed within said first mentioned casing, said second casing being provided with an inwardly extending flange arranged to engage the rear face of said grille and to yieldably urge the same into engagement with the rear face of the inwardly directed flange formed on the outer casing.

3. In a device of the character described, a casing, a damper having an opening, a hinge for hingedly mounting said damper within said casing, a spring for normally moving said damper in one direction about its point of hinged mounting, a flexible actuating member for moving said damper in the other direction about its point of hinged mounting, said actuating member being extended through said opening formed in said damper, and means for anchoring said actuating member to said damper comprising a bushing mounted in the opening in said damper, a spring seating in a recess formed in said bushing, and an abutment on said actuating member engaging said spring.

4. In a device of the character described, a casing, a damper having an opening and being hingedly mounted within said casing, a spring normally urging said damper to open position, a flexible member passing through said opening in said damper for moving said damper to closed position, means including a spring surrounding said flexible member for anchoring one end thereof to the damper, and a bushing in the opening in said damper providing a seat for one end of said spring.

5. In a device of the character described, an outer casing having a flange, a grille positioned within said outer casing, an inner casing fixed within said outer casing and having a portion engaging said grille for yieldably urging the same into engagement with said flange formed on said outer casing, a damper hingedly mounted in said inner casing, means normally urging said damper to open position, a flexible member anchored to said damper and extending through the said grille for moving the damper to closed position, said flexible member being provided throughout its length with a plurality of spaced enlargements, and a locking member fixed to said outer casing, said locking member being provided with an opening through which said flexible member loosely extends and being provided with a slot with which said flexible member may be engaged, the enlargements of said flexible member being arranged to prevent longitudinal movement of the flexible member through the slot.

6. The combination with a room wall having an opening therein for the discharge of air into the room, and a stack positioned in said opening and arranged to discharge air through the same, of a casing mounted in said opening and having an inwardly extending plane surfaced portion snugly engaging the said stack adjacent the discharge end thereof, a grille positioned in said casing providing relatively small openings through which the air discharged from said stack may flow, a second casing mounted in the first casing and supporting the grille therein, and a damper member hingedly mounted in the second casing adapted to be adjusted toward or from closed position relative to the grille.

7. The combination with a room wall having an opening therein, and a stack arranged in said opening for discharge through the same into a room, of an outer casing having a portion engaging the wall adjacent the opening therein and having a second portion engaging the stack adjacent the discharge end thereof, a second casing positioned within the outer casing and having an inwardly extending resilient flange, and a damper pivotally mounted in said second casing and so arranged with respect thereto that the edge of said damper snugly engages the inwardly extending flange on said second casing when the damper is in closed position.

8. A grille for controlling the discharge of air at one temperature into a room having air at a different temperature, said grille comprising a plurality of fins made from narrow strips of ribbon-like thinness and adapted to be supported across an air discharge opening with opposing side faces in closely spaced relation, said fins cooperating to form a multiplicity of narrow transversely elongated passages operative to divide a moving body of air flowing through the grille into separately confined streams, the width of the fins being substantially greater than and correlated with the spacing between them so as to impart directional control to said air streams while passing through the grille, and a multiplicity of diffusing elements protruding from the discharge edge portions of the fins partially across said narrow passages and arranged to provide a plurality of transversely spaced rows with the elements in each row protruding in the same direction, said elements being in the form of depressions bent from the discharge edge portions of the fins and shaped to provide outwardly and laterally inclined deflecting surfaces with rounded sides, adapted to be impinged upon by said air streams to produce a turbulence in the moving body of air beyond the grille.

9. A grille for controlling the forcible discharge of air at one temperature into a room having air at a different temperature comprising, in combination, a supporting frame, and a group of thin narrow fins supported in said frame in closely spaced relation with their side faces parallel and with their discharge edges coacting to form the front face of the grille, said fins defining a plurality of transversely elongated air passages and having longitudinally spaced portions bent to form a multiplicity of deflectors projecting partially across said passages at the discharge edges of the fins for impingement by portions of the air streams upon their discharge from the grille, and said deflectors being arranged in a plurality of rows extending perpendicular to the fins with the contiguous elements in each row protruding from adjacent fins in the same direction.

10. A grille for controlling the discharge of air at one temperature into a room having air at a different temperature comprising, in combination, a supporting frame, a group of thin narrow fins supported in said frame in uniformly spaced relation with their discharge edges coacting to form the front face of the grille, said fins cooperating to form a plurality of narrow transversely elongated air passages and having longitudinally spaced portions bent to form a multiplicity of deflectors inclined toward said front face of the grille for impingement by the air streams confined by said passages, said deflectors being arranged in parallel rows spaced a short distance apart across the front face of the grille with the deflectors of adjacent rows protruding from the discharge edge portions of the respective fins in the same direction.

11. A grille for controlling the discharge of air at one temperature into a room having air at a different temperature comprising, in combination, a supporting frame, a group of thin narrow fins mounted in said frame with their side faces spaced a short distance apart uniformly and in opposing relation and with their discharge edges coacting to form the front face of the grille, said fins cooperating to form a plurality of narrow transversely elongated air passages and having their discharge edge portions bent to form a multiplicity of deflectors spaced apart lengthwise of the fins and disposed so as to be impinged upon by the air streams in their discharge from said passages, said deflectors being located at regular intervals across the front face of the grille and forming with the intervening portions of each of the fins a continuous forward edge with a periodic departure from a straight line.

12. A grille for controlling the discharge of air into a room comprising, in combination, a supporting frame, a group of thin narrow fins supported in said frame in closely spaced relation with their discharge edges coacting to form a front face, said fins cooperating to form a plurality of narrow transversely elongated air passages extending rearwardly from said face, and a multiplicity of deflectors spaced apart longitudinally of the fins and disposed in the paths of the air streams passing through the grille, said deflectors being positioned to act upon said streams adjacent the point of discharge thereof from the grille so as to change the direction of flow of spaced portions of the streams upon leaving the grille relative to adjacent intervening portions of the streams.

JOHN A. GERMONPREZ.